(12) United States Patent
Baldemair et al.

(10) Patent No.: US 10,764,001 B2
(45) Date of Patent: Sep. 1, 2020

(54) RECEIVER-SPECIFIC TRANSMISSION LENGTH

(71) Applicant: Telefonaktiebolaget LM Ericsson (publ), Stockholm (SE)

(72) Inventors: Robert Baldemair, Solna (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/344,146

(22) PCT Filed: Oct. 27, 2017

(86) PCT No.: PCT/EP2017/077690
§ 371 (c)(1),
(2) Date: Apr. 23, 2019

(87) PCT Pub. No.: WO2018/078139
PCT Pub. Date: May 3, 2018

(65) Prior Publication Data
US 2019/0327034 A1   Oct. 24, 2019

Related U.S. Application Data

(60) Provisional application No. 62/414,636, filed on Oct. 28, 2016.

(51) Int. Cl.
| | | |
|---|---|---|
| H04L 1/18 | (2006.01) | |
| H04L 5/00 | (2006.01) | |
| H04W 72/04 | (2009.01) | |

(52) U.S. Cl.
CPC .......... H04L 1/1854 (2013.01); H04L 1/1887 (2013.01); H04L 5/0055 (2013.01); H04W 72/0446 (2013.01)

(58) Field of Classification Search
CPC ... H04L 1/1854; H04L 1/1887; H04L 5/0055; H04W 72/0446
(Continued)

(56) References Cited

U.S. PATENT DOCUMENTS 7,069,038 B2 *   6/2006   Hakkinen ............. H04L 1/0081
                                                       370/332
10,517,051 B2 *  12/2019  Seo ........................ H04L 5/0055
(Continued)

FOREIGN PATENT DOCUMENTS

| WO | 2009072962 A1 | 6/2009 |
| WO | 2016048597 A1 | 3/2016 |

OTHER PUBLICATIONS

Qualcomm Incorporated, "Scaled Numerology Control Design for NR", 3GPP TSG-RAN WG1 #86, Gothenburg, Sweden, Aug. 22, 2016, pp. 1-10, Gothenburg, R1-166363, 3GPP.

*Primary Examiner* — John J Tabone, Jr.
(74) *Attorney, Agent, or Firm* — Coats & Bennett, PLLC (57) ABSTRACT

Techniques for selecting and utilizing one or more novel symbol structures, control signaling, and scheduling for wireless signal transmission/reception are presented. An example method is presented that includes determining (302), based on control information corresponding to a slot, that a user equipment (UE) (102A) or another UE (102B) in communication with a network node (106) is to transmit acknowledgement (ACK) or negative acknowledgement (NACK) feedback in the slot for a downlink signal received by the UE (102A) or the other UE (102B) in the slot. In addition, the example method includes transmitting (304) an intermediate uplink signal to the network node (106) and/or receiving an intermediate downlink signal from the network node (106) after the downlink signal is fully received and before transmission of the ACK or NACK feedback begins.

(Continued)

Example apparatuses, such as UEs and network nodes, and computer programs/code are also presented.

26 Claims, 10 Drawing Sheets

(58) Field of Classification Search
USPC .......... 714/748, 749, 821; 455/450; 370/282
See application file for complete search history.

(56) References Cited

U.S. PATENT DOCUMENTS

| | | | |
|---|---|---|---|
| 2004/0224697 A1* | 11/2004 | Hakkinen | H04L 1/0081 |
| | | | 455/450 |
| 2008/0279143 A1 | 11/2008 | Lee et al. | |
| 2012/0008585 A1* | 1/2012 | Kwon | H04W 72/042 |
| | | | 370/329 |
| 2012/0113948 A1* | 5/2012 | Kwon | H04L 5/0053 |
| | | | 370/329 |
| 2018/0359745 A1* | 12/2018 | Yeo | H04W 72/14 |
| 2019/0158252 A1* | 5/2019 | Li | H04W 72/0406 |
| 2019/0182643 A1* | 6/2019 | Kim | H04W 4/44 |

* cited by examiner

FIGURE 1

| UL Opportunity in this Slot | Report AN in this Slot | |
|---|---|---|
| | Yes | No |
| Yes | L1 | L2 |
| No | Invalid | L3 |

RECEIVER-SPECIFIC TRANSMISSION LENGTH

PRIORITY APPLICATION

The present application claims priority to U.S. Provisional Patent Application No. 62/414,636, entitled "Receiver-Specific Transmission Length" and filed on Oct. 28, 2016, the entirety of which is incorporated by reference.

TECHNICAL FIELD

The present disclosure generally relates to wireless communication systems, and specifically relates to timing of wireless signal transmissions within the wireless communication system.

BACKGROUND

In current wireless communication systems, after processing a signal received from a network node (e.g., base station, NodeB, eNB, etc.), a user equipment (UE) may generate and transmit an acknowledgement (ACK) or negative acknowledgement (NACK) to the network node as feedback indicating whether the received signal has been successfully received. In some of these systems, the UE may generate and transmit the ACK/NACK ("AN" or "A/N") signal within the same slot during which the downlink signal was received. For this same-slot ACK/NACK signal transmission to occur, the processing time required for the UE to generate the ACK/NACK signal typically must be less than the time that remains in the slot (minus residual time, e.g., time required for actual uplink ACK/NACK transmission) following the symbol during which the downlink signal was transmitted by the network node and received by the UE.

As this processing time is typically longer than an Orthogonal Frequency Division Multiplexed (OFDM) symbol in a slot (e.g., containing seven OFDM symbols), a conservative gap of multiple OFDM symbols in the uplink/downlink frame structure is created in some implementations to allow the UEs in communication with a network node temporary on-demand access to the medium (e.g., one or more carriers utilized for UE-network node communication over a certain time period) for transmitting the ACK/NACK signal after its requisite processing is completed. In instances where the ACK/NACK signal processing time is relatively long (e.g., greater than two OFDM symbols), a substantial system performance opportunity cost may arise as a result of the medium being effectively unused as UEs and network nodes of the system await ACK/NACK processing resolution.

Thus, improved uplink control frame structures and related techniques for uplink control signal transmission are needed to optimize performance and resource utilization relative to those of existing systems.

SUMMARY

One or more embodiments herein employ different potential scheduling techniques, frame structures, and control information communication methods for signal communication in a wireless environment. Specifically, the network and one or more UEs may communicate wirelessly during one or more interim symbols concurrent to ACK/NACK processing at a particular UE. By implementing frame structures that allow for uplink and/or downlink communication during ACK/NACK-related processing, channel utilization and communication performance can be increased at the link/channel level, and correspondingly, at the system level when aggregated.

Particularly, embodiments presented below include an example method performed by a network node for wireless communication with a UE and another UE during a slot. The example method may include generating control information corresponding to the slot, the control information indicating that the UE or the other UE is to transmit ACK or NACK feedback in the slot for a downlink signal received by the UE or the other UE in the slot. The method may include transmitting the control information to the UE and the other UE, and transmitting, during the slot, an intermediate downlink signal to the UE and/or the other UE or receiving an intermediate uplink signal from the UE and/or the other UE after the downlink signal is fully received and before transmission of the ACK or NACK feedback begins.

The disclosure also presents an example method performed by a UE for wireless communication with a network node during a slot. The method may include determining, based on control information corresponding to the slot, that the UE or another UE in communication with the network node is to transmit ACK or NACK feedback in the slot for a downlink signal received by the UE or the other UE in the slot. The method may further include transmitting an intermediate uplink signal to the network node or receiving an intermediate downlink signal from the network node after the downlink signal is fully received and before transmission of the ACK or NACK feedback begins.

Embodiments herein also include apparatuses (e.g., UEs, network nodes, modules, components, units, etc.) computer programs, and carriers (e.g., computer program products), corresponding to these methods.

DETAILED DESCRIPTION

Figure 1:
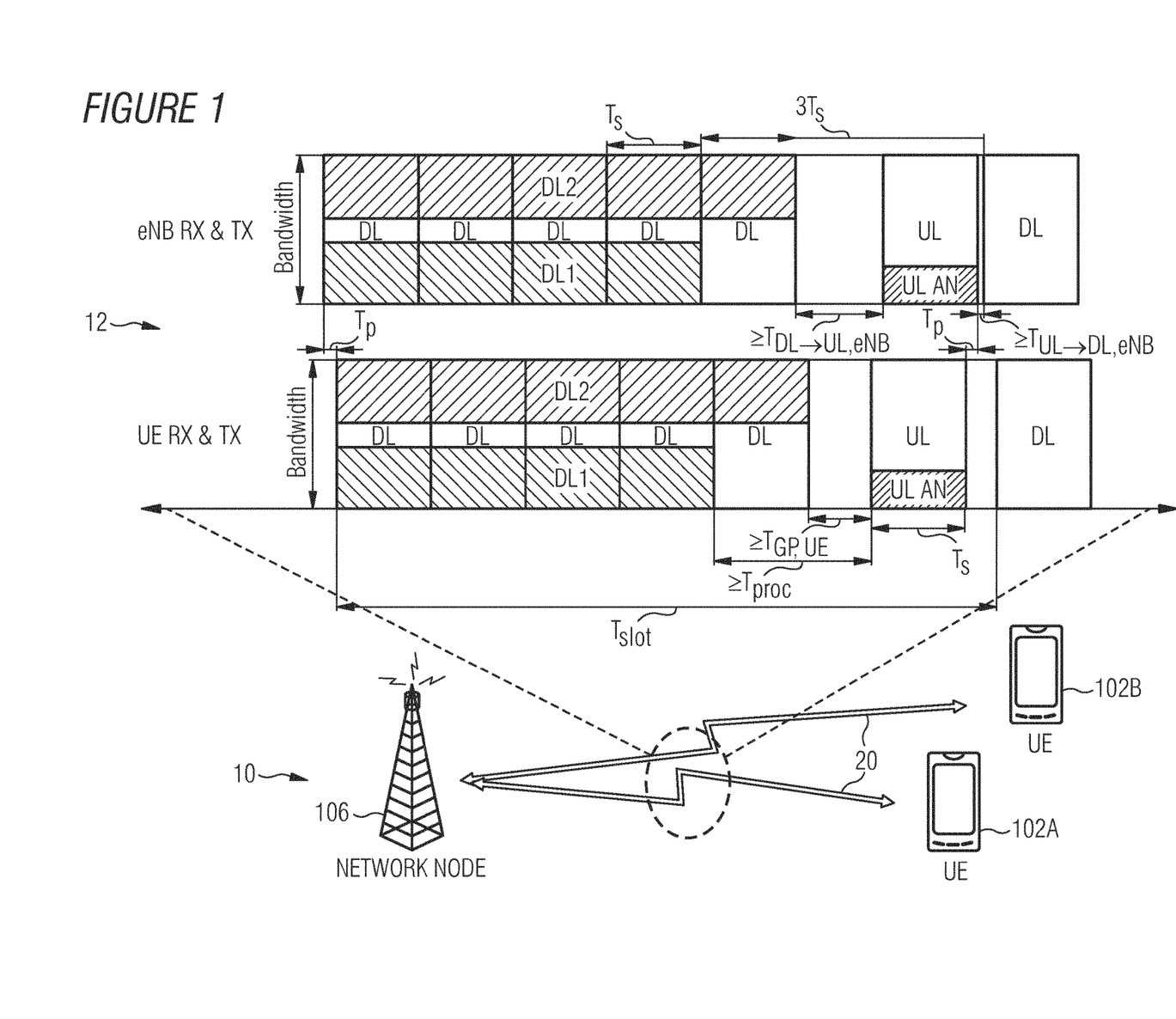
FIG. 1 is a block diagram of a wireless communication system according to one or more embodiments.

FIG. 1 illustrates a wireless communication system 10 according to one or more embodiments. The system 10 includes a network node 106 (such as, but not limited to, a base station, eNB, etc). The system 10 also includes UEs 102 (also referred to herein as a "terminal, "user terminal," or the like), including UE 102A and 102B, in communication with the network node 106. This communication 20, in addition to uplink and downlink transmission of user/application data and/or ACK/NACK ("A/N" or "AN") associated with the user/application data, may include uplink control signaling and downlink control signaling (also referred to as control information). The communication 20 may occur over one or more communication channels that may each consist of one or more component carriers or sub-bands. The network node 106 may include circuitry and/or instructions for executions on the circuitry to perform scheduling of communications 20 between the UEs 102 and the network node 106. This scheduling can involve assignments (or "grants") of certain time-frequency resources to individual UEs 102 with which the network node 106 is communicating in the wireless communication system 10. These time-frequency resources may be resource elements, resource blocks, or any other unit of time-frequency resources known in the art. For any given measure of time during the communication 20, an entire channel bandwidth or a portion thereof may be granted to a particular UE 102 or to a plurality of UEs 102 (i.e., to UE 102A and/or UE 102B).

As shown in FIG. 1, like existing wireless communication systems that implement existing standards/protocols, communication 20 is scheduled according to a particular communication frame structure in the frequency (y-axis) and time (x-axis) domains for both the network node (e.g., eNB) 106 and the UEs 102. As shown, communication can be conducted with separate UEs 102A and 102B over separate sub-bands of the system bandwidth. The frame structure (also referred to herein as "slot structure," "subframe structure," or "symbol structure") 12 ensures uniformity in communication between devices in the wireless communication system 10. For instance, communication may be scheduled and may occur in the uplink and downlink according to defined frame, subframe, slot, and symbol units. In an aspect, each frame of the frame structure 12 may comprise a defined number of subframes (e.g. 10), each subframe may comprise a particular number of slots (e.g. 2), and each slot may comprise a particular number of symbols (e.g., 6 or 7). In the non-limiting example shown in FIG. 1, frame structure 12 includes one of a plurality of consecutive slots (which may be identifiable by an index) and having an associated uniform time duration, represented herein as $T_{slot}$.

Furthermore, each of these slots may be divided into shorter time units called symbols, which can also have a particular index value. Unlike most existing frame structures, however, though downlink symbols (e.g., downlink symbols 0-3 containing a downlink signal transmitted to a UE 102A (DL1) and downlink symbols 0-4 containing a continuous downlink signal transmitted to a UE 1028 (DL2)) may have a uniform time duration $T_s$ and associated numerology, embodiments described in the present disclosure can include additional symbol types, which can be utilized for at least some uplink or downlink transmissions. These uplink transmissions may include one or both of user/application data and control signals, such as, but not limited to ACK/NACK signals, reference signals (e.g., sounding reference signals (SRS)), channel quality information (Ec/Io, channel quality/state index or information (CQI/CSI), etc.), neighbor cell information, scheduling requests, or any other uplink control signaling, or uplink transmissions generally, known in the art. These symbol types may include one or more intermediate uplink symbols between the end of a downlink signal reception and the uplink transmission of the ACK or NACK for that downlink signal (during $T_{proc}$ and represented in the Figures as "ULAN"). During these intermediate symbols, UL and DL communication may occur between the network node 106 and UEs 102. In some embodiments, the symbols of a slot can have a time duration that is less than $T_s$ and may also have a numerology that differs from the other symbols of the slot.

Figure 2:
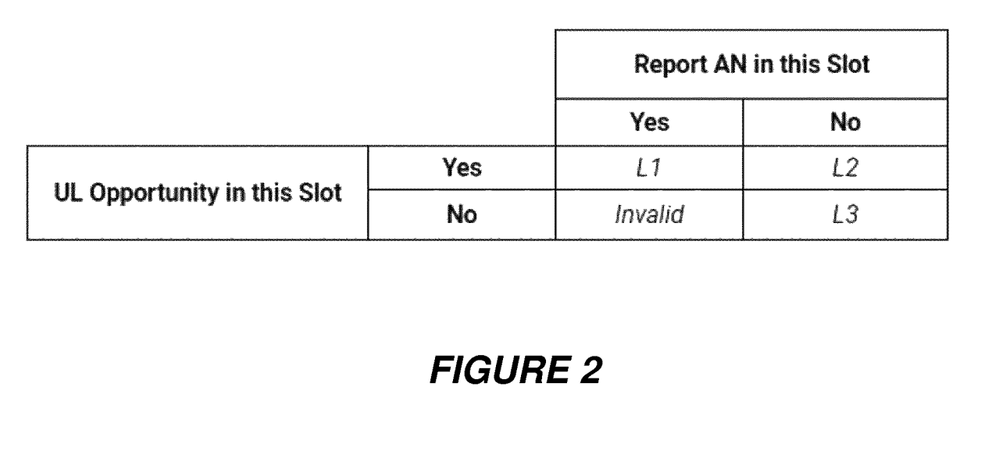
FIG. 2 is a table showing example control information in one or more embodiments.

In an aspect, UEs 102 may receive control information from the network node 106 from which the UEs 102 can determine when each of their respective downlink transmissions are to end, as downlink transmissions to the UEs may differ in their respective length/time duration (as shown in FIG. 1, DL2 is longer than DL1, for instance). As shown in the table of FIG. 2, this control information may indicate whether there is an uplink transmission opportunity in the slot. Additionally or alternatively, the control information can include information indicating whether the receiving UE 102 is to generate and transmit ACK/NACK feedback for received downlink symbols during the slot. If the control information indicates a UE 102 is to transmit ACK/NACK feedback, the network may continue to transmit downlink signals during the one or more intermediate slot symbols and/or the UEs 102 may transmit uplink signals over unused time/frequency resources previously reserved for the ACK/NACK uplink transmission. During these intermediate slots and concurrent to potential further uplink/downlink signal transmission/reception, the UE 102 may process the received downlink signal to determine its integrity (e.g., determine whether a cyclic redundancy check (CRC) passes, a symbol number is valid, and/or other determinations upon which ACK/NACK is determined and generated).

The control information can be utilized by the UEs 102 to determine a length of time (or number of symbols, for instance) that a received DL transmission extends in time in the slot. One possibility is to signal this length of time explicitly to the receiving UE 102 (and/or one or more other UEs) using dedicated signaling or indicators piggybacked on existing signaling. Alternatively, or combined with some explicit signaling, the UE can derive the DL transmission length implicitly from other signaling to the UE. For instance, as introduced above, this signaling can indicate (a) if there is an UL opportunity at the end of this slot and/or (b) if the UE itself should report ACK/NACK feedback (AN) at the end of this slot. In some examples, the information regarding whether a particular slot has an UL opportunity at its end can be conveyed to a UE as part of the scheduling downlink control information (DCI) or it could be signaled/broadcasted over another (e.g., control) channel. Additionally, in some embodiments, the information that a UE shall report ACK/NACK feedback in the slot can be communicated to the UE in the DCI that scheduled the corresponding downlink transmission. Alternatively or additionally, the UE could be informed in a separate control message to generate ACK/NACK feedback in this slot. FIG. 2 shows the information from which the UE derives the DL transmission length based on the information "UL opportunity in this slot yes/no" and "Report AN in this slot yes/no". As indicated by the table in FIG. 2, if the control information indicates that there is no UL opportunity in this slot but the UE should report AN in this slot, this is an invalid configuration and should not occur in a best case scenario. If there is no UL opportunity in this slot, the UE should not report any AN, and therefore its DL transmission can span the complete slot (L3). If there is an UL opportunity but the UE should not use this opportunity for AN transmission, its DL transmission length is L2 (length of DL2 in e.g. FIG. 1). If the UE should report AN and an UL opportunity is in this slot the DL transmission must be shorter (L1) than L2 and L3 to enable the decoding at the UE (length of DL1 in e.g. FIG. 1). Thus, in some examples, L1<L2<L3.

The control information indicating how much shorter L2 is compared to L3 can be communicated together with the control information above or the UE could be informed in a separate message, e.g. via Radio Resource Control (RRC) signaling, Medium Access Control (MAC) control element, etc. The value of L1 could be arrived at through negotiation between base station and UE (i.e. how long does UE need to decode) together with the UL duration. Alternatively, the processing time could be fixed in the standard and L1 follows from the UL duration.

As introduced above, in some examples, the control information can be combined with some explicit signaling. This explicit signaling could be L3, that is the length of the DL transmission if it extends until the end of the slot. In some embodiments, L3 can be included in the DCI scheduling the transmission or the transmission duration could semi-statically configured (e.g. via RRC signaling). L3 could be expressed in number of slots (potentially together with mini-slots, a shorter version of a slot). L1 and L2 can then be computed based on L3 together with "UL opportunity in this slot yes/no" and "Report AN in this slot yes/no".

In the frame structure 12 of FIG. 1 and the implementations of the other figures below, during the processing time needed by the decoding UE, another UE is served by another transmission by the network node in the DL (DL2) over other resources. In an aspect, DL2 may begin at any time and may comprise a continuous DL transmission from the beginning of the slot or may be continued from one or more previous slots. As shown, DL1 is the transmission that is processed during the processing/decoding time Tproc. In an aspect, the transmission DL2 must stop early enough so that reception of "UL AN" from the decoding UE is feasible at the network node/base station. In a non-duplex capable base station this implies that the network node stops at least transmitting DL-UL-guard-time $T_{DL \to UL, eNB}$ before it receives "UL AN". A full-duplex capable base station would not have to stop transmitting during the time it receives. In the frame structure 12 of FIG. 1, the guard is still quite large since here it is assumed that transmission must be one or multiple OFDM symbols and inserting one more OFDM symbol in DL2 would not fit. Guard time $T_{UL \to DL, eNB}$ is the required switching time between UL reception and DL transmission at the network node (also referred to as "eNB" or "base station" herein), and $T_{PIS}$ represents the propagation delay.

In a further aspect, the one or more intermediate symbols can span a duration greater than half of a duration of the downlink symbol and may be transmitted over a greater bandwidth than that of the other symbols of the slot. After communicating during the intermediate symbol(s), and after processing of the downlink signal to generate the ACK/NACK signal by a particular UE, the UE 102A may transmit the ACK/NACK feedback signal (or, simply, "feedback") for the received downlink signal during subsequent symbol (s) of the slot. As illustrated by the example embodiments below, these intermediate symbols and subsequent symbols may take different forms in duration and location in the time (and/or frequency) domain, and in some examples, may even be effectively combined into a single symbol or multiple symbols.

Therefore, as described above, aspects of the presently disclosed embodiments and techniques include selecting and utilizing one or more novel symbol structures, control signaling, and/or scheduling techniques in a slot for signal transmission/reception. This allows the network node 106 and UE 102 to maximize the communication payload that can be communicated in a given slot (e.g., by adding one or more additionally utilized downlink or uplink symbols relative to existing slot structures).

Figure 3:
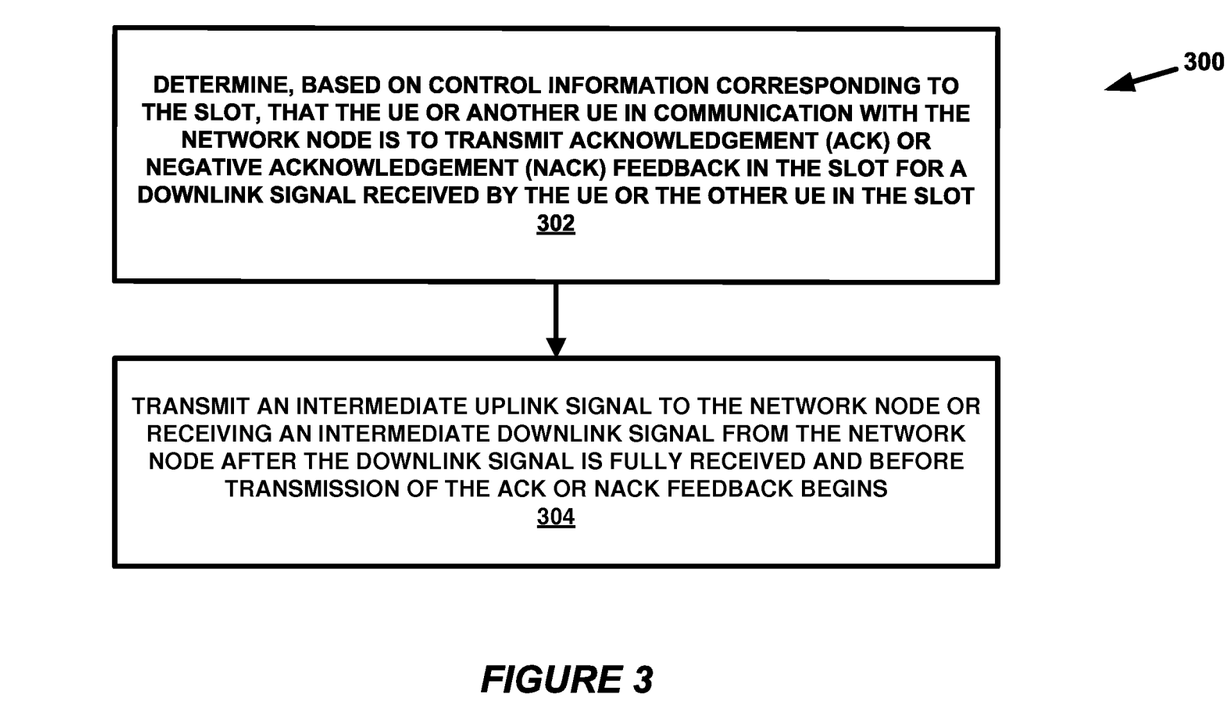
FIG. 3 is a logical flow diagram illustrating a method performed by a UE according to one or more embodiments.

FIG. 3 illustrates an example method 300 performed by one or more UEs 102 for communication with a network node in a wireless communication system 10. According to the example method 300, the UE may determine, at block 302, based on control information corresponding to the slot, that the UE or another UE in communication with the network node is to transmit acknowledgement (ACK) or negative acknowledgement (NACK) feedback in the slot for a downlink signal received by the UE or the other UE in the slot. The method 300 may also include, at block 304, transmitting an intermediate uplink signal to the network node or receiving an intermediate downlink signal from the network node after the downlink signal is fully received and before transmission of the ACK or NACK feedback begins.

Additional or alternative aspects to those of method 300 of FIG. 3 are also contemplated, and are described further in reference to FIGS. 1 and 2 above or below in relation to the remaining figures. For instance, as described in reference to FIG. 2, in some instances, the control information may include an indication as to whether the UE 102A or the other UE 102B is to transmit ACK or NACK feedback in the slot and/or whether an uplink transmission opportunity exists in the slot. Also, in some examples, the control information can include information indicative of a time or symbol at which transmission of the intermediate uplink signal is to begin and/or a time or symbol at which reception of the intermediate downlink signal is to end.

In some examples, receiving the intermediate downlink signal can include receiving a portion of a continuous downlink signal, where reception of the continuous downlink signal begins before the downlink signal is fully received. Likewise, in some instances, different downlink signals received by the UE 102A and by the other UE 102B in the slot differ in length. Furthermore, a time period after the downlink signal is fully received and before transmission of the ACK or NACK feedback begins can correspond to or can include a processing time for generating the ACK or NACK feedback at the UE or the other UE. As introduced above, the control information can be received in method 300 from the network node 106 via dedicated control signaling or via additional information piggybacking on existing control signaling.

Figure 4:
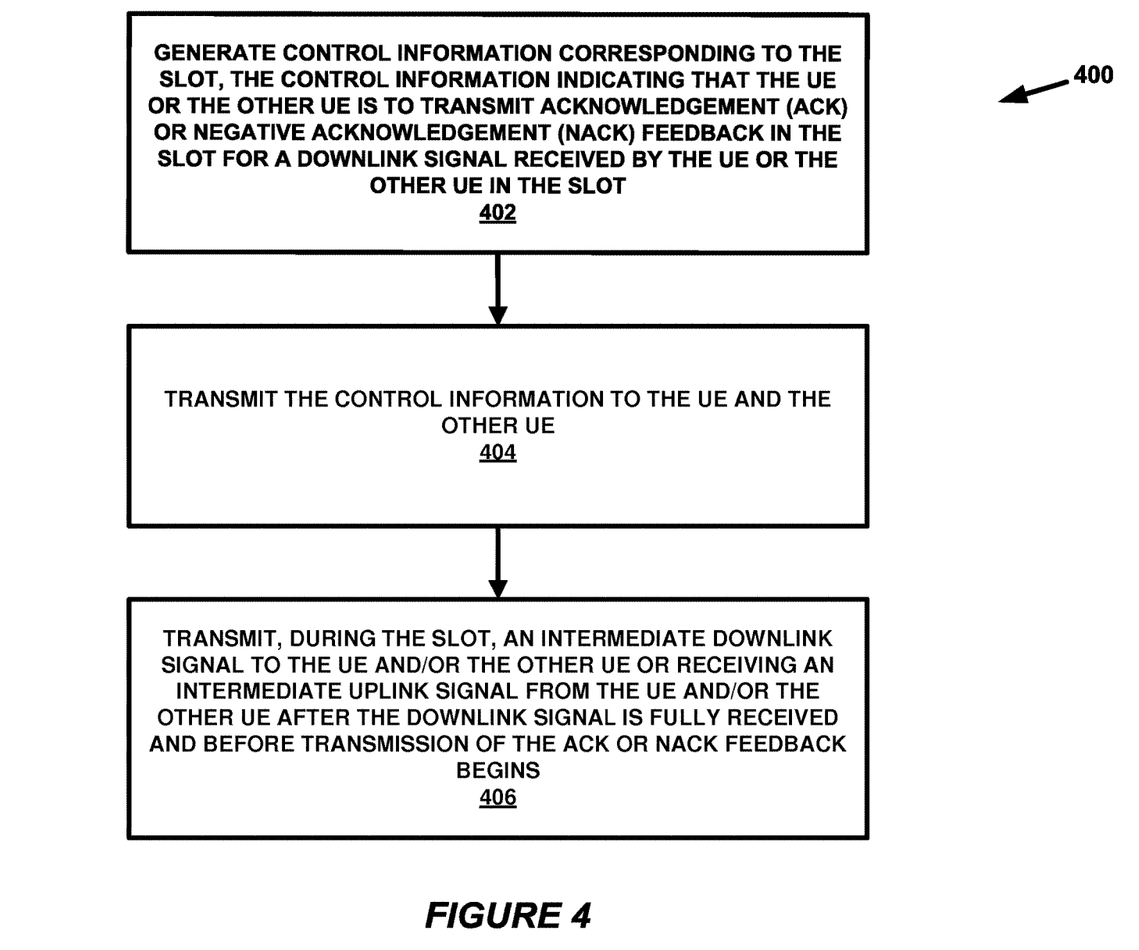
FIG. 4 is a logical flow diagram illustrating a method performed by a network node according to one or more embodiments.

FIG. 4 illustrates an example method 400 performed by a network node for communication with a UE and another UE during a slot. For instance, method 400 may include generating, at block 402, control information corresponding to the slot, the control information indicating that the UE or the other UE is to transmit acknowledgement (ACK) or negative acknowledgement (NACK) feedback in the slot for a downlink signal received by the UE or the other UE in the slot. The method 400 may also include, at block 404, transmitting the control information to the UE and the other UE and, at block 406, transmitting, during the slot, an intermediate downlink signal to the UE and/or the other UE or receiving an intermediate uplink signal from the UE or the other UE after the downlink signal is fully received and before transmission of the ACK or NACK feedback begins.

Additional or alternative aspects to those of method 400 of FIG. 4 are also contemplated, and are described further above and/or below. For instance, as described in reference to FIG. 2, in some instances, the control information may include an indication as to whether the UE 102A or the other UE 102B is to transmit ACK or NACK feedback in the slot and/or whether an uplink transmission opportunity exists in the slot. Also, in some examples, the control information can include information indicative of a time or symbol at which transmission of the intermediate uplink signal is to begin and/or a time or symbol at which reception of the intermediate downlink signal is to end.

In some examples, transmitting the intermediate downlink signal can include transmitting a portion of a continuous downlink signal, where transmission of the continuous downlink signal begins before the downlink signal is fully received by the UE 102A. Likewise, in some instances, different downlink signals received by the UE 102A and by the other UE 102B in the slot differ in length. Furthermore, a time period after the downlink signal is fully received and before transmission of the ACK or NACK feedback begins can correspond to or can include a processing time for generating the ACK or NACK feedback at the UE or the other UE. As introduced above, the control information can be transmitted in method 400 by the network node 106 via dedicated control signaling or via additional information piggybacking on existing control signaling.

Figure 5:
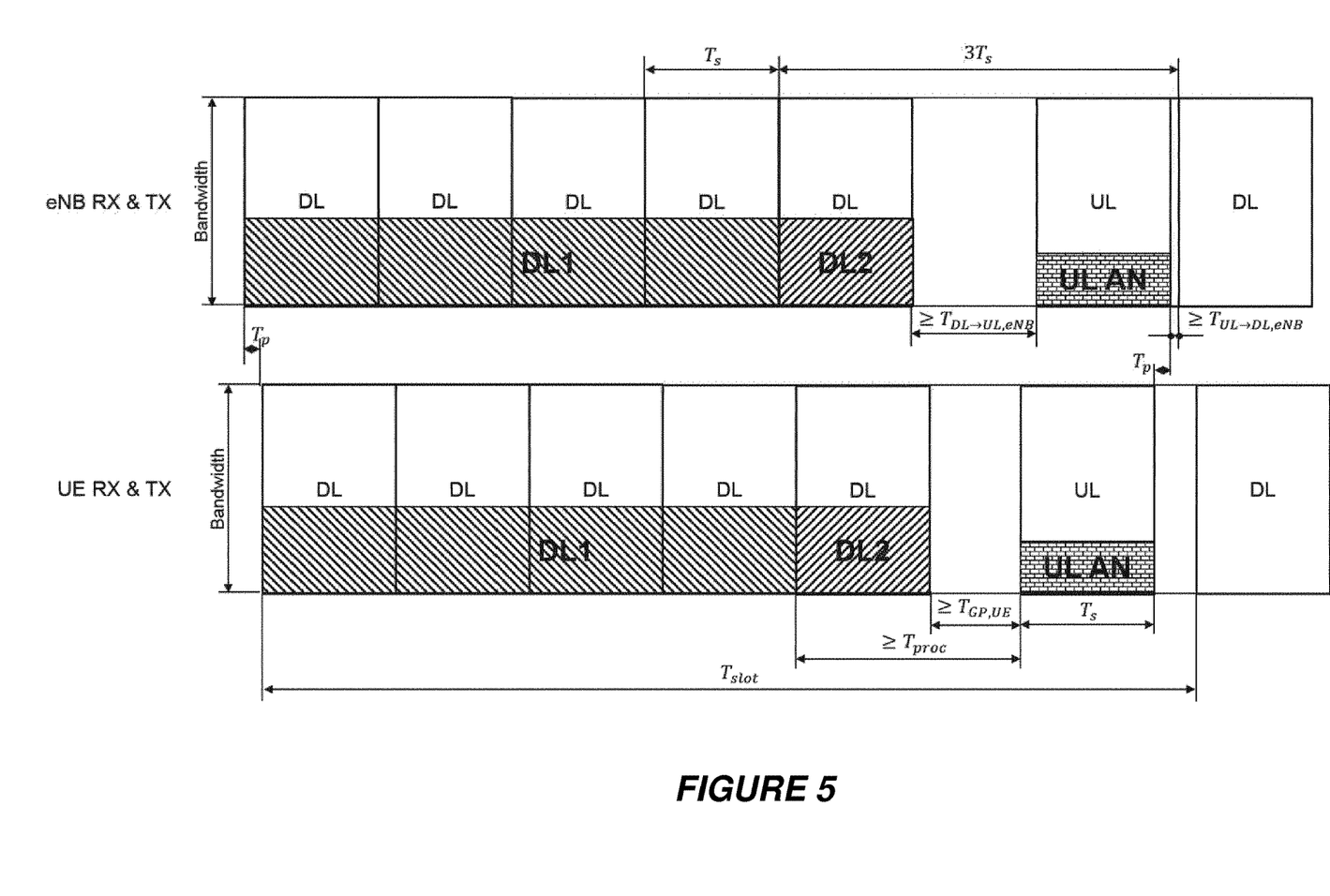
FIG. 5 is a diagram illustrating an example frame structure according to one or more embodiments.

FIG. 5 illustrates another example embodiment of the improved slot structure of the present disclosure. In this example embodiment, one particular UE 102 receives another DL transmission (DL2) after the UE receives DL1. The ACK/NACK feedback for DL1 is contained in the UL transmission "UL AN," which occurs after the intermediate symbol(s) between when DL2 is completed and when the ACK/NACK is transmitted. In some examples, DL1 and DL2 may have different bandwidth and location in the frequency domain. In an aspect of the present disclosure, the transmission DL2 by the network node ("eNB") must stop early enough so that reception of "UL AN" is feasible at the network node due to a time required by the network node hardware and related processes to switch between signal reception and signal transmission (or vice versa).

Figure 6:
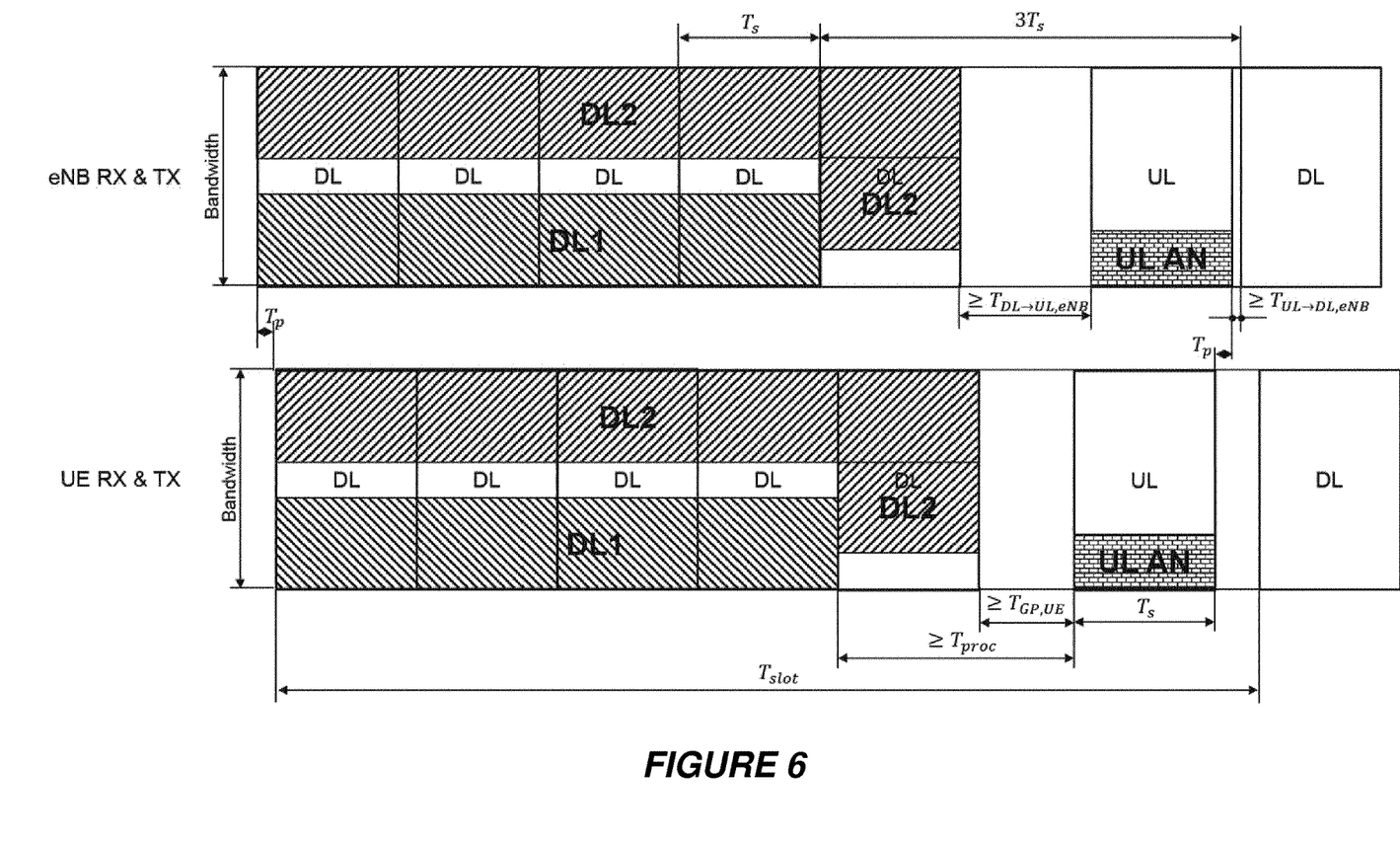
FIG. 6 is a diagram illustrating an example frame structure according to one or more embodiments.

FIG. 6 illustrates another example slot structure embodiment wherein downlink signal DL2 is transmitted by the network node to one of the UEs 102A or another UE 102B during an intermediate symbol or symbols before transmission of (and during the processing/generation of) the ACK/NACK feedback signal by a particular UE 102. Accordingly, in FIG. 6, a DL transmission DL2 uses empty frequency resources after another DL transmission DL1 stops. Also, in the example shown in FIG. 6, the transmission DL2 starts at the beginning of the slot shown. However, this is not a limiting aspect. Instead, the DL signal transmission DL2 could start at a later time, including at the time that DL1 is fully received. Again, in some example embodiments, the DL transmission DL2 stops early enough so that reception of "UL AN" from the decoding UE is feasible at the network node (eNB).

Figure 7:
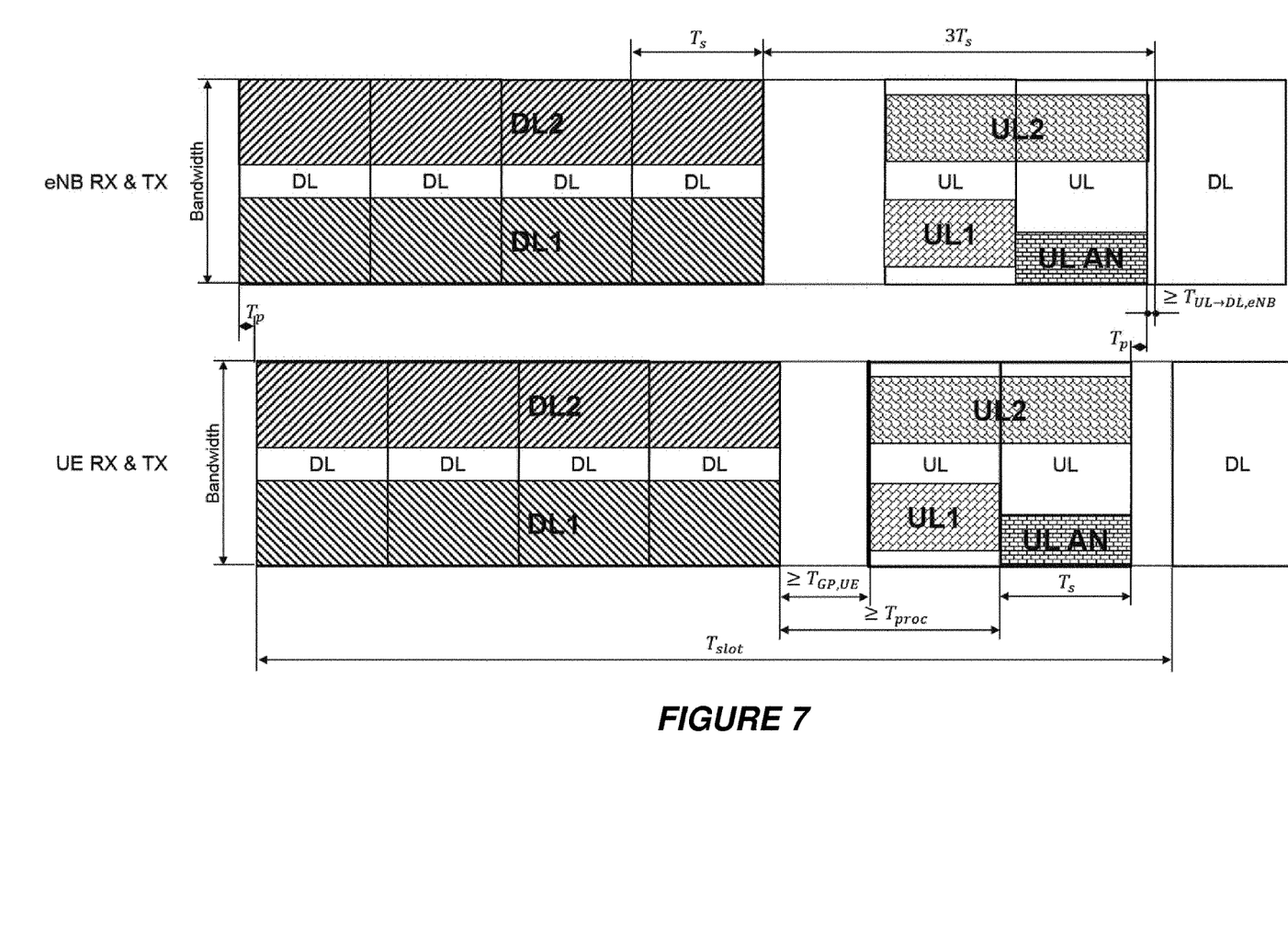
FIG. 7 is a diagram illustrating an example frame structure according to one or more embodiments.
Figure 8:
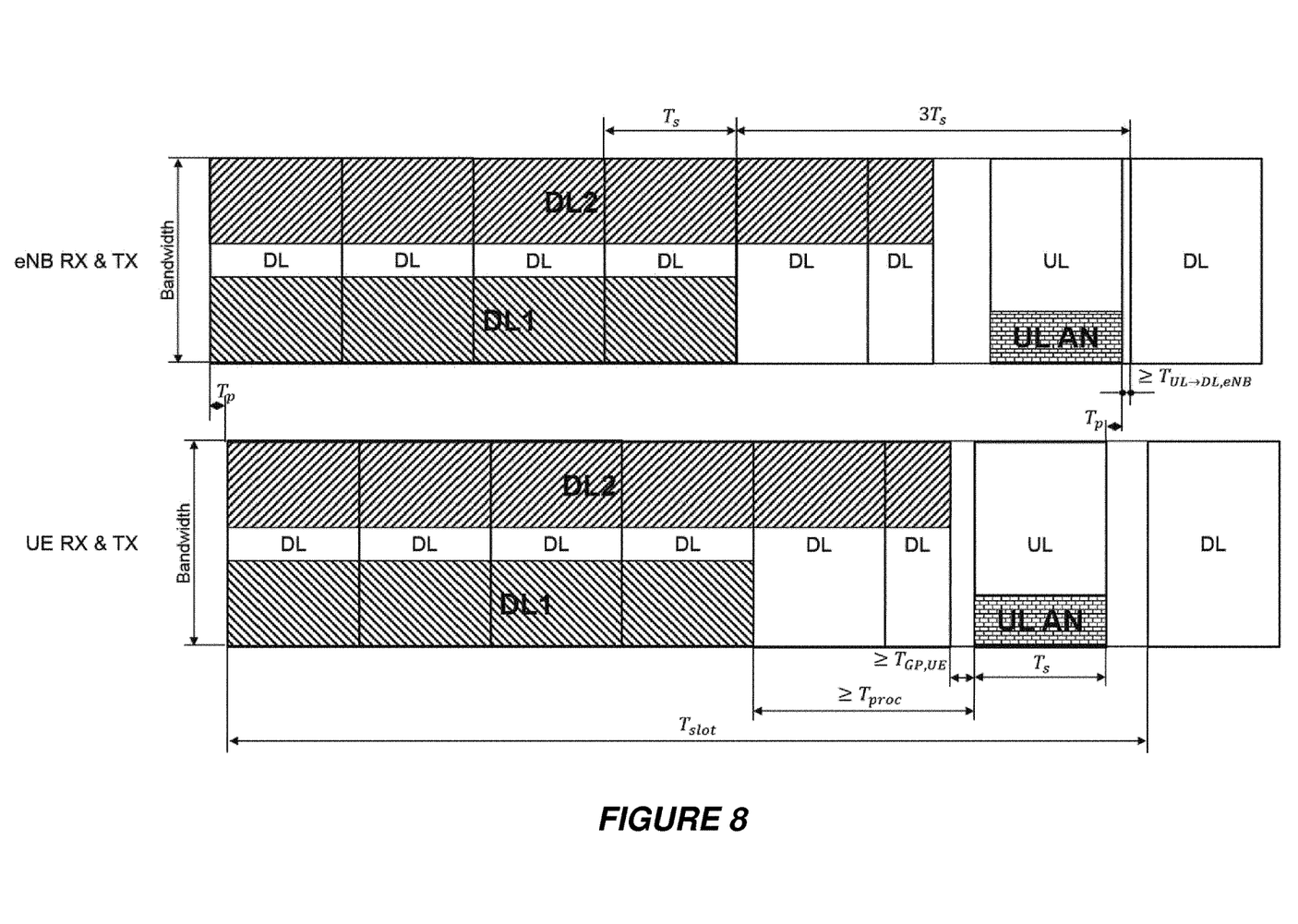
FIG. 8 is a diagram illustrating an example frame structure according to one or more embodiments.

FIG. 7 illustrates a further example embodiment wherein, unlike other embodiments described above, the UEs 102 transmit uplink signals to the network node during the intermediate symbol(s) and/or concurrent to the ACK/NACK feedback transmission of another UE but on different frequency resources. To allow these uplink transmissions, the DL transmissions may stop earlier than the previous examples (e.g. at the same time, as shown in FIG. 7)) which allows the UEs to transmit in the UL instead of receiving DL transmissions. These UL transmissions can come from the same UE that is to transmit ACK/NACK feedback (as in UL1 of FIG. 7 or UE 102A of FIG. 1), and/or from another UE (as in UL2 of FIG. 7 or UE 102B of FIG. 1). In an additional aspect, though not shown in FIG. 7, because the UL1 transmission (which is transmitted from the same terminal that transmits "UL AN" after UL1) does not depend on decoding result of DL1, in principal transmission of UL1 could continue simultaneously with "UL AN" transmission. Correspondingly, a long enough time gap $T_{DL \to UL, eNB}$ may be required in some embodiments to enable UL signal reception at the network node/eNB.

In summary, a UE requires a minimum time for processing ACK/NACK feedback related to a received downlink signal from the network. The techniques described herein utilize this minimum time duration for further uplink and/or downlink transmissions during this ACK/NACK processing time, thereby utilizing system resources to a greater degree than solutions presented in prior art solutions. The network node 106 of the present disclosure may transmit control information (such as described in relation to FIG. 2, above), from which the UE(s) 102 can determine whether the UE(s) 102 can determine whether ACK/NACK feedback is to be transmitted in a particular slot. Because different DL transmissions sent over different resources to different UEs 102 in a slot may have different signal lengths (in terms of time, and accordingly, symbol length), the control information may further indicate, implicitly or explicitly, the timing of any uplink or downlink transmissions to be conducted in the slot. Accordingly, this extended transmission duration can be used for longer symbols, more symbols, and/or longer cyclic prefixes, and can therefore minimize the degree to which available resources go unutilized while waiting for ACK/NACK feedback signal processing/generation to complete.

Figure 9A:
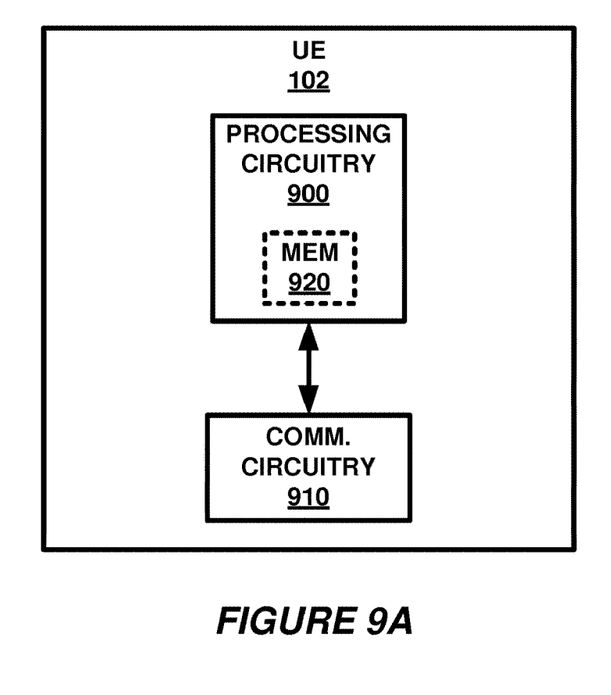
FIG. 9A is a block diagram of a UE according to one or more embodiments.

FIG. 9A illustrates a UE 102 implemented in accordance with one or more embodiments. As shown, the UE 102 includes processing circuitry 900 and communication circuitry 910. The communication circuitry 910 is configured to transmit and/or receive information to and/or from one or more network nodes 106 via any communication technology. Such communication may occur via one or more antennas that are either internal or external to the UE 102. The processing circuitry 900 is configured to perform processing described above, such as by executing instructions stored in memory 920. The processing circuitry 900 in this regard may implement certain functional means, units, or modules.

Figure 9B:
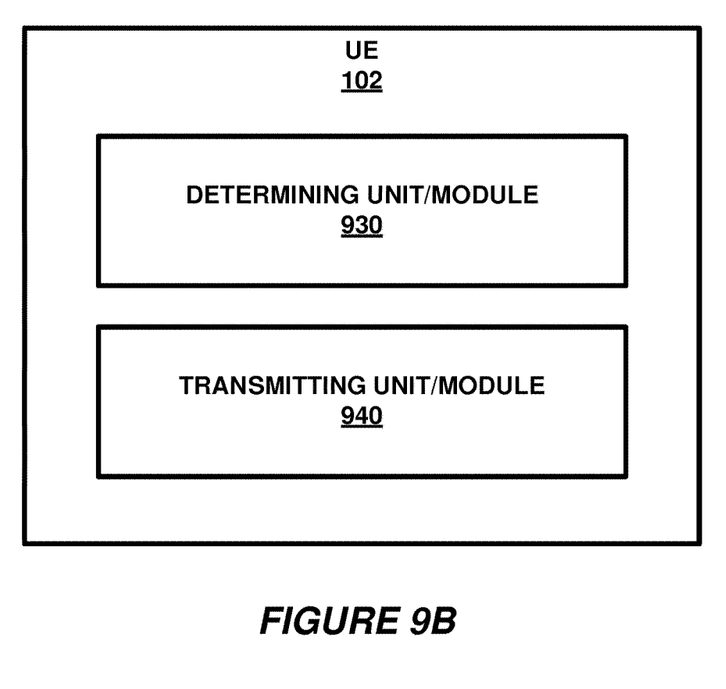
FIG. 9B is a block diagram of a UE according to one or more other embodiments.

FIG. 9B illustrates a UE 102 implemented in accordance with one or more other embodiments. As shown, the UE 102 implements various functional means, units, or modules, e.g., via the processing circuitry 900 in FIG. 9A and/or via software code. These functional means, units, or modules, e.g., for implementing the method 300 in FIG. 3 and the frame structures of at least FIGS. 1 and/or 5-8, include for instance a determining unit or module 930 for determining, based on control information corresponding to the slot, that the UE or another UE in communication with the network node is to transmit acknowledgement (ACK) or negative acknowledgement (NACK) feedback in the slot for a downlink signal received by the UE or the other UE in the slot. Also included is a transmitting unit or module 940 for transmitting an intermediate uplink signal to the network node or receiving an intermediate downlink signal from the network node after the downlink signal is fully received and before transmission of the ACK or NACK feedback begins. In addition, although FIG. 9B does not explicitly include an unit/module for all example aspects described herein as being possibly performed by a UE 102, the UE 102 may include additional units/modules configured to perform these possible aspects.

Figure 10A:
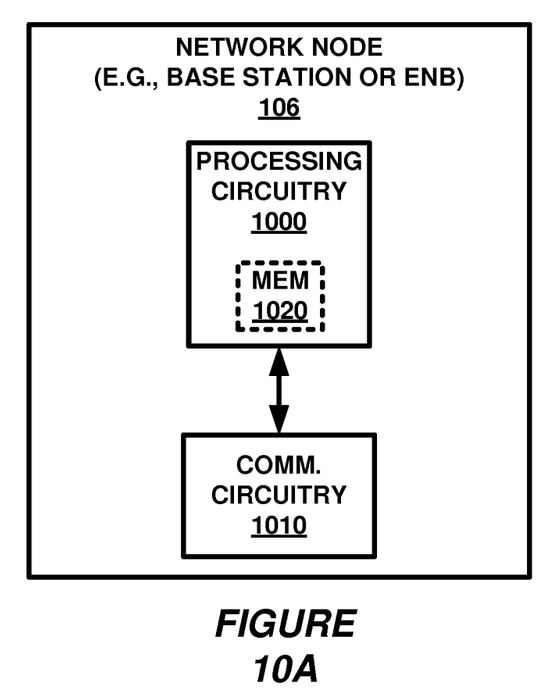
FIG. 10A is a block diagram of a network node according to one or more embodiments.

FIG. 10A illustrates a network node 106, such as a base station, eNB, or other network-side devices, implemented in accordance with one or more embodiments. As shown, the network node 106 includes processing circuitry 1000 and communication circuitry 1010. The communication circuitry 1010 is configured to transmit and/or receive information to and/or from one or more UEs 102 and/or one or more other nodes, e.g., via any communication technology. Such communication may occur via one or more antennas that are either internal or external to the network node 106. The processing circuitry 1000 is configured to perform processing described above, e.g., in FIG. 3, such as by executing instructions stored in memory 1020. The processing circuitry 1000 in this regard may implement certain functional means, units, or modules.

Figure 10B:
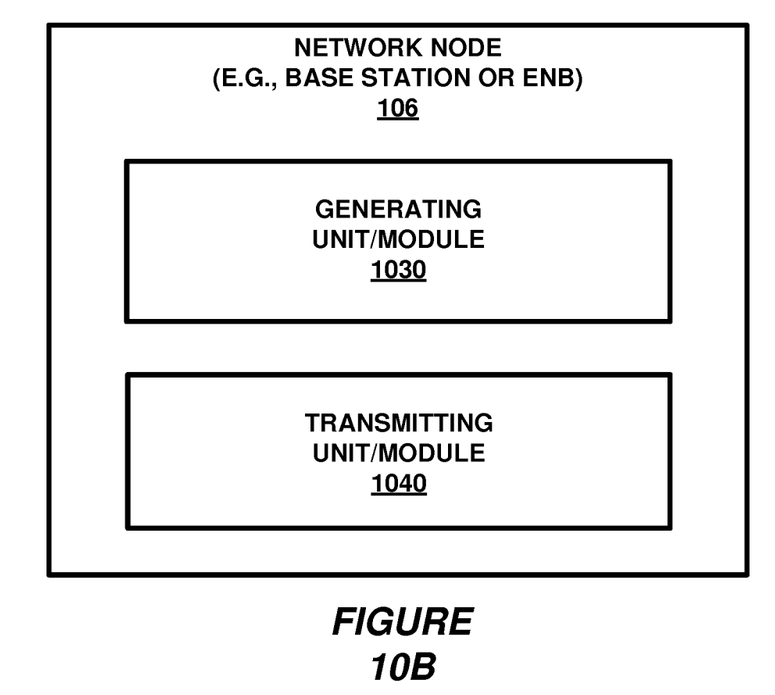
FIG. 10B is a block diagram of a network node according to one or more other embodiments.

FIG. 10B illustrates a network node 106 implemented in accordance with one or more other embodiments. As shown, the network node 106 implements various functional means, units, or modules, e.g., via the processing circuitry 1000 in FIG. 10A and/or via software code. These functional means, units, or modules, e.g., include for instance a generating unit or module 1030 for generating control information corresponding to the slot, the control information indicating that the UE or the other UE is to transmit acknowledgement (ACK) or negative acknowledgement (NACK) feedback in the slot for a downlink signal received by the UE or the other UE in the slot. Also included is a transmitting unit or module 1040 for transmitting the control information to the UE and the other UE and transmitting, during the slot, an intermediate downlink signal to the UE and/or the other UE or receiving an intermediate uplink signal from the UE or the other UE after the downlink signal is fully received and before transmission of the ACK or NACK feedback begins. In addition, although FIG. 10B does not explicitly include an unit/module for all example aspects described herein as being possibly performed by a network node 106, the network node 106 may include additional units/modules configured to perform these possible aspects.

Those skilled in the art will also appreciate that embodiments herein further include corresponding computer programs. A computer program comprises instructions which, when executed on at least one processor of a node, cause the node to carry out any of the respective processing described above. A computer program in this regard may comprise one or more code modules corresponding to the means or units described above. Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of a network node or UE, cause the node or UE to perform as described above. Embodiments further include a computer program product comprising program code portions for performing the steps of any of the embodiments herein when the computer program product is executed by a computing device. This computer program product may be stored on a computer readable recording medium.

Furthermore, the processing or functionality of network node 106 may be considered as being performed by a single instance or device or may be divided across a plurality of instances of network node 106 that may be present in a given network/environment such that together the device instances perform all disclosed functionality. In addition, network node 106 may be any known type of device associated with a wireless communication network, radio communication network, or content delivery network, generally, that is known to perform a given disclosed processes or functions thereof. Examples of such network nodes include eNBs (or other types of base stations or access points), Mobility Management Entities (MMEs), gateways, servers, and the like.

In any scenario discussed above, the UE 102 herein may be, or may be comprised of any wireless communication device that is able to communicate wirelessly with a wireless communication network, and may include, in some examples, mobile devices such as mobile phones, PDAs, tablets, computers (mobile or otherwise) laptops, or the like. In addition the UE 102 may comprise an Internet-of-Things device, e.g. a device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

In addition, many of the embodiments described herein are described as occurring within a slot. Though the term slot can correspond to the known time measure equal to half of a subframe (e.g., a Type 1 LTE frame structure), this is not a limiting aspect. For instance, the term "slot" herein may also include an "aggregate slot," that may in some examples "straddle" multiple slots (i.e., may include portions of multiple LTE frame structure slots) and/or may have a time duration that corresponds to an LTE frame structure slot. In some examples, the slot may not correspond to the LTE frame structure slot in terms of location in time or length of time. For instance, the "slot" may correspond to a subframe length in an LTE frame structure or any other time length that may be utilized (and/or "agreed upon") by the UE and network node.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a user equipment (UE), for wireless communication with a network node during a slot, the method comprising:
   determining, based on control information corresponding to the slot, that the UE or another UE in communication with the network node is to transmit acknowledgement (ACK) or negative acknowledgement (NACK) feedback in the slot for a downlink signal received by the UE or the other UE in the slot; and
   receiving an intermediate downlink signal from the network node after the downlink signal is fully received and before transmission of the ACK or NACK feedback begins;
   wherein receiving the intermediate downlink signal comprises receiving a portion of a continuous downlink signal, wherein reception of the continuous downlink signal begins before the downlink signal is fully received.

2. The method of claim 1, wherein the control information comprises an indication as to whether the UE or the other UE is to transmit ACK or NACK feedback in the slot and/or whether an uplink transmission opportunity exists in the slot.

3. The method of claim 1, wherein the control information comprises information indicative of a time or symbol at which transmission of the intermediate uplink signal is to begin and/or a time or symbol at which reception of the intermediate downlink signal is to end.

4. The method of claim 1, wherein different downlink signals received by the UE and by the other UE in the slot differ in length.

5. The method of claim 1, wherein a time period after the downlink signal is fully received and before transmission of the ACK or NACK feedback begins comprises a processing time for generating the ACK or NACK feedback at the UE or the other UE.

6. The method of claim 1, wherein the control information is received from the network node via dedicated control signaling or via additional information piggybacking on existing control signaling.

7. A user equipment (UE) in communication with a network node during a slot, the UE comprising:
 processing circuitry;
 memory containing instructions executable by the processing circuitry whereby the UE is operative to:
  determine, based on control information corresponding to the slot, that the UE or another UE in communication with the network node is to transmit acknowledgement (ACK) or negative acknowledgement (NACK) feedback in the slot for a downlink signal received by the UE or the other UE in the slot; and
  receive an intermediate downlink signal from the network node after the downlink signal is fully received and before transmission of the ACK or NACK feedback begins;
  wherein the UE receiving the intermediate downlink signal comprises the UE receiving a portion of a continuous downlink signal, wherein reception of the continuous downlink signal begins before the downlink signal is fully received.

8. The UE of claim 7, wherein the control information comprises an indication as to whether the UE or the other UE is to transmit ACK or NACK feedback in the slot and/or whether an uplink transmission opportunity exists in the slot.

9. The UE of either of claim 7, wherein the control information comprises information indicative of a time or symbol at which transmission of the intermediate uplink signal is to begin and/or a time or symbol at which reception of the intermediate downlink signal is to end.

10. The UE of claim 7, wherein different downlink signals received by the UE and by the other UE in the slot differ in length.

11. The UE of claim 7, wherein a time period after the downlink signal is fully received and before transmission of the ACK or NACK feedback begins comprises a processing time for generating the ACK or NACK feedback at the UE or the other UE.

12. The UE of claim 7, wherein the control information is received from the network node via dedicated control signaling or via additional information piggybacking on existing control signaling.

13. A non-transitory computer readable recording medium storing a computer program product for controlling a User Equipment (UE), the computer program product comprising software instructions which, when run on processing circuitry of the UE, causes the UE to:

determine, based on control information corresponding to the slot, that the UE or another UE in communication with the network node is to transmit acknowledgement (ACK) or negative acknowledgement (NACK) feedback in the slot for a downlink signal received by the UE or the other UE in the slot; and
 receive an intermediate downlink signal from the network node after the downlink signal is fully received and before transmission of the ACK or NACK feedback begins;
 wherein the receiving the intermediate downlink signal comprises receiving a portion of a continuous downlink signal, wherein reception of the continuous downlink signal begins before the downlink signal is fully received.

14. A method, performed by a network node, for wireless communication with a user equipment (UE) and another UE during a slot, the method comprising:
 generating control information corresponding to the slot, the control information indicating that the UE or the other UE is to transmit acknowledgement (ACK) or negative acknowledgement (NACK) feedback in the slot for a downlink signal received by the UE or the other UE in the slot;
 transmitting the control information to the UE and the other UE; and
 transmitting, during the slot, an intermediate downlink signal to the UE and/or the other UE after the downlink signal is fully received and before transmission of the ACK or NACK feedback begins;
 wherein the transmitting the intermediate downlink signal comprises transmitting a portion of a continuous downlink signal, wherein reception of the continuous downlink signal by the UE or the other UE begins before the downlink signal is fully received.

15. The method of claim 14, wherein the control information comprises an indication as to whether the UE or the other UE is to transmit ACK or NACK feedback in the slot and/or whether an uplink transmission opportunity exists in the slot.

16. The method of claim 14, wherein the control information comprises information indicative of a time or symbol at which transmission of the intermediate uplink signal is to begin and/or a time or symbol at which reception of the intermediate downlink signal is to end.

17. The method of claim 14, wherein different downlink signals received by the UE and by the other UE in the slot differ in length.

18. The method of claim 14, wherein a time period after the downlink signal is fully received by the UE or the other UE and before transmission of the ACK or NACK feedback begins comprises a processing time for generating the ACK or NACK feedback at the UE or the other UE.

19. The method of claim 14, wherein the control information is transmitted by the network node via dedicated control signaling or via additional information piggybacking on existing control signaling.

20. A network node for wireless communication with a user equipment (UE) and another UE during a slot, the network node comprising:
 processing circuitry;
 memory containing instructions executable by the processing circuitry whereby the network node is operative to:
  generate control information corresponding to the slot, the control information indicating that the UE or the other UE is to transmit acknowledgement (ACK) or negative acknowledgement (NACK) feedback in the slot for a downlink signal received by the UE or the other UE in the slot;

transmit the control information to the UE and the other UE; and transmit, during the slot, an intermediate downlink signal to the UE and/or the other UE after the downlink signal is fully received and before transmission of the ACK or NACK feedback begins;

wherein the transmitting the intermediate downlink signal comprises the network node transmitting a portion of a continuous downlink signal, wherein reception of the continuous downlink signal by the UE or the other UE begins before the downlink signal is fully received.

21. The network node of claim 20, wherein the control information comprises an indication as to whether the UE or the other UE is to transmit ACK or NACK feedback in the slot and/or whether an uplink transmission opportunity exists in the slot.

22. The network node of claim 20, wherein the control information comprises information indicative of a time or symbol at which transmission of the intermediate uplink signal is to begin and/or a time or symbol at which reception of the intermediate downlink signal is to end.

23. The network node of claim 20, wherein different downlink signals received by the UE and by the other UE in the slot differ in length.

24. The network node of claim 20, wherein a time period after the downlink signal is fully received by the UE or the other UE and before transmission of the ACK or NACK feedback begins comprises a processing time for generating the ACK or NACK feedback at the UE or the other UE.

25. The network node of claim 20, wherein the control information is transmitted by the network node via dedicated control signaling or via additional information piggybacking on existing control signaling.

26. A non-transitory computer readable recording medium storing a computer program product for controlling wireless communication of a network node with a user equipment (UE) and another UE during a slot, the computer program product comprising software instructions which, when run on processing circuitry of the network node, causes the network node to:

generate control information corresponding to the slot, the control information indicating that the UE or the other UE is to transmit acknowledgement (ACK) or negative acknowledgement (NACK) feedback in the slot for a downlink signal received by the UE or the other UE in the slot;

transmit the control information to the UE and the other UE; and transmit, during the slot, an intermediate downlink signal to the UE and/or the other UE after the downlink signal is fully received and before transmission of the ACK or NACK feedback begins;

wherein the transmitting the intermediate downlink signal comprises the network node transmitting a portion of a continuous downlink signal, wherein reception of the continuous downlink signal by the UE or the other UE begins before the downlink signal is fully received.

* * * * *

UNITED STATES PATENT AND TRADEMARK OFFICE
CERTIFICATE OF CORRECTION

Page 1 of 1

PATENT NO.        : 10,764,001 B2
APPLICATION NO.   : 16/344146
DATED             : September 1, 2020
INVENTOR(S)       : Baldemair et al.

It is certified that error appears in the above-identified patent and that said Letters Patent is hereby corrected as shown below:

In the Specification

In Column 3, Line 53, delete "1028" and insert -- 102B --, therefor.

In the Claims

In Column 11, Line 46, in Claim 9, delete "of either of" and insert -- of --, therefor.

Signed and Sealed this
Twelfth Day of April, 2022

Drew Hirshfeld
*Performing the Functions and Duties of the
Under Secretary of Commerce for Intellectual Property and
Director of the United States Patent and Trademark Office*